March 4, 1969 H. W. SCHAFFT 3,430,316

METHOD FOR POLARIZING PIEZOELECTRIC MATERIAL

Filed May 23, 1967

Inventor
HUGO W. SCHAFFT

BY Mueller, Aichele & Rauner 3,430,316
METHOD FOR POLARIZING PIEZO-ELECTRIC MATERIAL Hugo W. Schafft, Des Plaines, Ill., assignor to Motorola, Inc., Franklin Park, Ill., a corporation of Illinois
Filed May 23, 1967, Ser. No. 640,742
U.S. Cl. 29—25.35 7 Claims
Int. Cl. B01j *17/00;* H04r *17/00*

ABSTRACT OF THE DISCLOSURE

The method involves placing an electrode on each of two opposing surfaces of the piezoelectric body and disposing a number of thin spaced conductors on the lateral surface thereof. When a DC voltage is applied between the electrodes, equipotential planes are induced through the conductors to define piezoelectric sections which are polarized by the electric fields between such planes.

*Background of the invention*

During recent years it has become more desirable to replace electromagnetic transducers with transducers employing piezoelectric material for reasons such as improved reliability and efficiency, lower cost, and smaller size. In order for piezoelectric material to be useful, it must first be polarized in a given direction so that when it is electrically or mechanically stimulated, a stress is created therein to cause movement of the material in a mode corresponding to the vectorial directions of the stimulus relative to the polarization. In order to provide such polarization, it is common to apply a DC voltage to electrodes disposed on surfaces which are normal to the desired direction of polarization. The degree of polarization is proportional to the DC voltage divided by the distance between the lateral surfaces otherwise known as the electric field. As this distance becomes longer, the electric field that the material can withstand, without becoming damaged, decreases. However, the electric field must be large enough to provide the required degree of polarization as determined by the particular type of material, and the mode in which it is to be used. A further problem arises because of the generally non-uniform characteristics of piezoelectric material so that the potential difference between regions of varying conductivity may be high enough to cause "punch through" of the material. Presently known methods for polarizing long pieces of piezoelectric material usually result in portions thereof which do not become polarized so as to reduce the efficiency of the material when it is used in a circuit.

*Summary of the invention*

It is, therefore, an object of this invention to provide a method for polarizing large pieces of piezoelectric material with a high voltage yet minimizing the possibility of damage thereto during such polarization.

Another object is to provide a method to polarize a large piece of piezoelectric material substantially throughout its volume so that when used in a circuit it will provide maximum efficiency.

In practicing a preferred form of the invention, it is desired to longitudinally polarize a body formed of piezoelectric material. The method of the invention includes disposing electrodes on the opposing end surfaces of the body across which a DC voltage is to be applied sufficiently large to subject the body to damage. A plurality of spaced pencil lines are drawn on one lateral surface of the body parallel to the end surfaces, and a corresponding plurality of spaced pencil lines are drawn on an opposing lateral surface thereof parallel to the end surfaces and aligned with the corresponding pencil lines on the one lateral surface. When a DC voltage is applied between the electrodes, a plurality of equipotential planes are generated between corresponding pencil lines and on the end surfaces to create similarly directed electric fields between successive equipotential planes to polarize the body. This does not reduce the electric field between each pair of planes so that the desired degree of polarization may be attained and since the distance polarized is the distance between successive planes, the possibility of damage to the material is reduced. When the body becomes polarized, the pencil lines are removed.

*Detailed description of the preferred embodiment*

Figure 1:
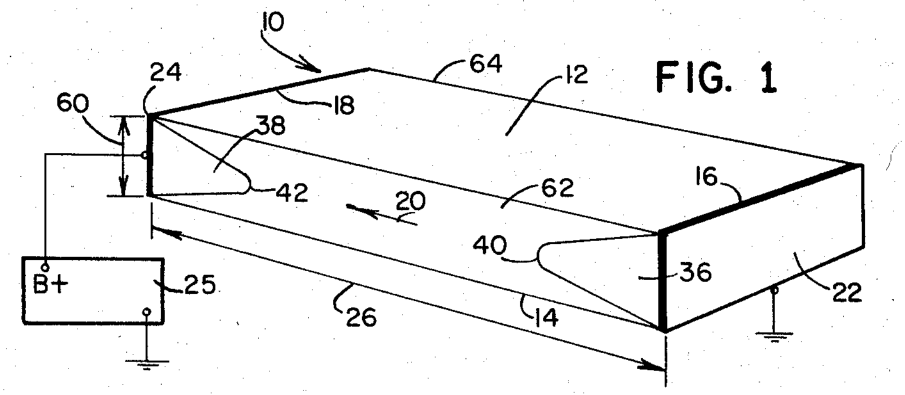
FIG. 1 illustrates a perspective view of a block of piezoelectric material which is to be polarized.

Referring now to the drawings, FIG. 1 illustrates a block or body 10 formed of piezoelectric material having a pair of opposing lateral surfaces 12 and 14 and a pair of opposing end surfaces 16 and 18. The body 10 is to be polarized in a direction normal to the end surfaces 16 and 18 as indicated by the arrow 20. This is accomplished by disposing electrodes 22 and 24 respectively on the end surfaces 16 and 18 by plating, for example, and then coupling a DC voltage supply 25 (indicated by B+) between them for a given period of time such as five minutes usually at an elevated temperature such as 120° C. This creates an electric field in the direction of arrow 20 equal in amplitude to the DC voltage divided by the length of the longitudinal dimension 26 of the body 10.

Figures 2, 3, 4, 5:
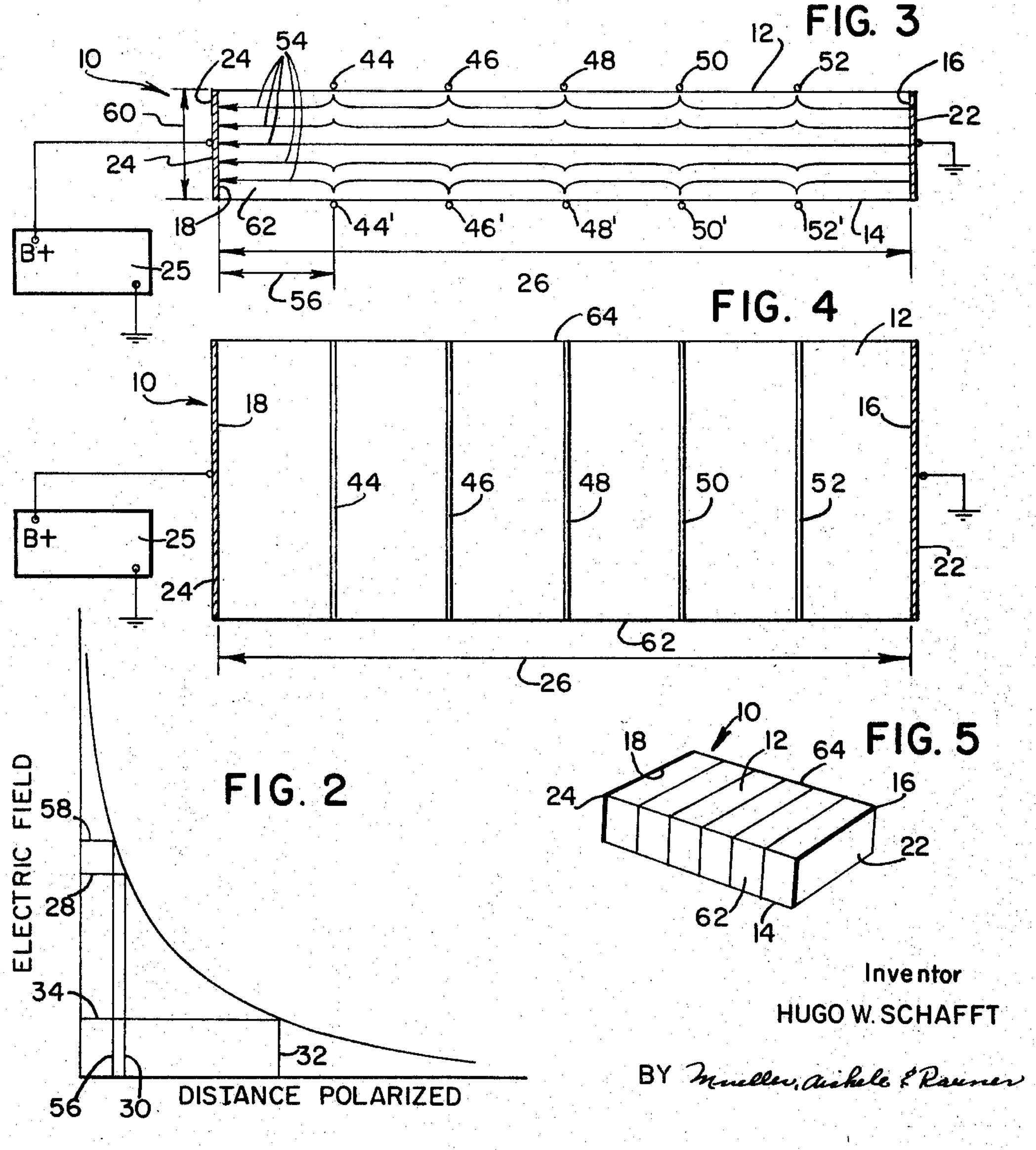
FIG. 2 is a graph of the maximum allowable electric field versus the distance being polarized.
FIG. 3 illustrates an elevation view of the block of FIG. 1 on an enlarged scale with pencil lines drawn thereon.
FIG. 4 illustrates a plan view of the block of FIG. 1 on an enlarged scale with the pencil lines drawn on two opposing lateral surfaces.
FIG. 5 illustrates another embodiment of the invention.

The graph of FIG. 2 illustrates the characteristic that the electric field which can be withstood by a body of piezoelectric material without being subjected to damage is approximately inversely proportional to the square root of the length of the longitudinal dimension 26. The magnitude of electric field necessary to provide a given degree of polarization is determined by the characteristics of the particular material and the mode (such as longitudinal or shear) in which it is to be used. Suppose it is determined that in order to satisfy such characteristics, an electric field having a magnitude 28 which requires a given voltage from supply 25 must be applied between electrodes 22 and 24. If the length of the longitudinal dimension 26 is greater than the length 30, corresponding to the electric field magnitude 28, the body 10 may become damaged. Assume that the longitudinal dimension 26 has a length 32 substantially greater than length 30 so that an electric field having a magnitude 34 is insufficient to polarize the body 10. The decrease in the magnitude of the electric field is achieved by decreasing the voltage from supply 25. An electric field having the necessary magnitude 28 cannot be applied across a length 32 without damaging the body.

Of additional importance in limiting the maximum electric field which can be applied without damaging the body 10 arises from the non-uniform characteristics which may exist in piezoelectric material. For example, high conductivity regions 36 and 38, respectively adjacent end surfaces 16 and 18, have an apex 40 slightly greater than the ground potential of electrode 22, and an apex 42 slightly less than the B+ potential of electrode 24. Note that the potential difference between the apexes 40 and 42 is approximately the same as the potential difference between the electrodes 22 and 24 but the length between them is less so that an electric field having an increased magnitude is effectively applied across a shorter length to subject the body 10 to damage. The regions 40 and 42 are schematically shown as existing on the front face of the body 10, but it may be appreciated that different conductivity regions may exist throughout the body 10.

Referring to FIGS. 3 and 4, the invention contemplates first disposing electrodes 22 and 24 respectively on the end surfaces 16 and 18 of the body 10. A plurality of conductors is then disposed on the lateral surface of the body by, for example, drawing stripes with a lead pencil, such stripes hereinafter being referred to as pencil lines. A plurality of such pencil lines 44–52 are drawn on the lateral surface 12 parallel to the opposing end surfaces 16 and 18 and spaced apart from one another and from such end surfaces. A corresponding plurality of pencil lines 44′–52′ are drawn on the opposing lateral surface 14 also parallel to the end surfaces and individually aligned with the pencil lines on surface 12.

A DC voltage supply 25 is then connected between the electrodes 22 and 24 to create electric field lines 54 in the direction indicated. Since the pencil lines 44–52 and 44′–52′ are at least slightly conductive, the voltage between electrodes 16 and 18 induces an equipotential plane through pencil lines 44 and 44′ parallel to the end surfaces, and a less positive equipotential plane through pencil lines 46 and 46′, etc. Thus, for example, if the pencil lines are equally spaced and if the B+ from supply 25 is 60 kilovolts, the voltage on electrode 24 (also an equipotential plane, of course) will be 60 kilovolts, the voltage on the equipotential plane through lines 44 and 44′ will be 50 kilovolts, the voltage on the plane through lines 46 and 46′ will be at 40 kilovolts, and so on to the electrode 22 (also an equipotential plane) which will be at zero volt. The five pairs of pencil lines form six sections of material spaced apart by distances 56 equal to ⅙ the length 32 of longitudinal dimension 26 so that the electric field in each section is the same as the electric field between the electrodes 16 and 18 with no pencil lines.

Referring to FIG. 2, when a distance 56 is polarized, an electric field having a magnitude 58 may be applied without damaging the body 10. In effect, this method separately polarizes each section by an electric field having a magnitude 58 at least as large as the magnitude 28 assumed necessary to polarize the body 10. By merely reducing the DC voltage from supply 25, the electric field can be reduced to magnitude 28. An increase in the number of pencil lines would permit a larger electric field to be applied. After the desired degree of polarization is attained, the conductors are removed, as by erasing the pencil lines.

The pencil lines also help to alleviate the problem arising from the non-uniform characteristics which may exist in the body 10. Without the pencil lines, a 60 kilovolt supply voltage would place the apex 42 of region 38 close to 60 kilovolts as explained previously. The equipotential plane defined by pencil lines 44 and 44′ will tend towards a 50 kilovolt level but because of the high conductivity of region 38, this level may be somewhat greater such as 53 kilovolts, and the equipotential plane defined by pencil lines 46 and 46′ may be at 41 kilovolts so that the point corresponding to the apex 42 would be about 50 kilovolts. Likewise the point in the body 10 corresponding to the apex 40 of region 36 would be at 10 kilovolts instead of at ground. Thus the potential difference between these points would be 40 kilovolts so that the possibility of damage is substantially less than the case without the pencil lines where the potential difference between such points would be on the order of 60 kilovolts.

Since the pencil lines function as DC voltage sources, the electric field lines 54 adjacent the lateral surfaces 12 and 14 may be slightly attracted thereto with the attraction of electric field lines 54 closer to the center being less pronounced. But even those field lines close to the surfaces are only slightly affected because the pencil lines are so narrow relative to the width 60 that fringing, that is deviation from an ideal longitudinal path, is minimized. Therefore, the body 10 is substantially completely polarized throughout so that its efficiency when used in a circuit is maximized. It should be noted that the supply 25 need not provide a plurality of voltages because no voltage is applied to the pencil lines which are electrically floating to assume potentials dependent on the number of lines, the spacing between them and the characteristics of the body 10.

Alternatively, as shown in FIG. 5, the pencil lines may be drawn entirely around the body, that is on the lateral surface including surfaces 12 and 14 and on front and rear surfaces 62 and 64 to define a closed boundary for the equipotential planes. Although the method has been described as being carried out by drawing lines with a standard lead pencil and a straight edge which is most desirable because it is simple and inexpensive, and the lines are easily removable by erasure, for example, it may be appreciated that very narrow conductors may be plated onto the surfaces having at least some conductivity to provide the same effect. In such case the electrodes must be narrow relative to the width 60 of the body 10 because as the conductors become wider, the electric field lines 54 are affected for a greater distance to cause additional fringing.

What has been described, therefore, is a simple, inexpensive method for polarizing large pieces of piezoelectric material without subjecting such material to damage in the presence of high voltages.

I claim:

1. A method for polarizing a body formed of piezoelectric material having a lateral surface and a pair of opposing end surfaces normal thereto, which method includes the steps of; disposing electrodes on the end surfaces for polarizing the body in a direction normal thereto, disposing a plurality of spaced conductors which are narrow relative to the width of the end surfaces at least partially about the lateral surface and parallel to the end surfaces, applying a direct current voltage between the electrodes to induce a plurality of equipotential planes respectively through the conductors and substantially parallel to the end surfaces to create similarly directed fields between the electrode on one end surface and the equipotential plane adjacent thereto, between succeeding equipotential planes, and between the electrode on the other end surface and equipotential plane adjacent thereto, whereby the body is polarized normal to the end surfaces and in the direction of the electric fields.

2. The method set forth in claim 1 wherein the step of disposing conductors on the lateral surface is accomplished by drawing a plurality of spaced lead pencil lines, with the equipotential planes defined by such pencil lines.

3. The method set forth in claim 1 wherein said body has a rectangular cross-section with parallely opposing first and second lateral surfaces, wherein the step of disposing conductors is accomplished by drawing a plurality of spaced pencil lines on the first lateral surface, the method further including the step of drawing a corresponding plurality of spaced pencil lines on the second lateral surface parallel to the end surfaces and aligned with the corresponding pencil lines on the first lateral surface, with the equipotential planes passing through corresponding pencil lines.

4. A method for polarizing a body formed of piezoelectric material having first and second opposing lateral surfaces and a pair of opposing end surfaces, which method includes the steps of; disposing electrodes on the end surfaces for polarizing the block in a direction normal thereto, drawing a plurality of spaced lead pencil stripes on the first lateral surface parallel to the end surfaces, drawing a corresponding plurality of spaced lead pencil stripes on the second lateral surface parallel to the end surfaces and aligned with the corresponding lead pencil stripes on the first longitudinal surface, applying a direct current voltage between the electrodes to induce a plurality of equipotential planes between corresponding pencil stripes to create similarly directed electric fields between the electrode on one end surface and the equipotential plane adjacent thereto, between succeeding equipotential planes, and between the electrode on the other end surface and the equipotential plane adjacent thereto, whereby the piezoelectric material is polarized normal to the end surfaces and in the direction of such electric fields.

5. The method set forth in claim 4 wherein the step of applying a direct current voltage is maintained for a time sufficient to provide a given degree of polarization.

6. The method set forth in claim 5 wherein after the given degree of polarization is provided, the further steps of, removing the direct current voltage, and then removing the lead pencil stripes.

7. The method set forth in claim 4 wherein the lead pencil stripes are drawn substantially equally spaced from one another.

References Cited

UNITED STATES PATENTS

| | | | |
|---|---|---|---|
| 2,540,187 | 2/1951 | Cherry | 310—8 |
| 3,071,841 | 1/1963 | Brussaard | 29—25.35 |
| 3,101,421 | 8/1963 | Kompanek | 310—9.7 X |

WILLIAM I. BROOKS, *Primary Examiner*.

U.S. Cl. X.R.

310—8